United States Patent
Schwab (10) Patent No.: US 8,899,002 B1
(45) Date of Patent: Dec. 2, 2014

(54) TRAY LOADER AND METHOD

(75) Inventor: Daniel J. Schwab, Rochester, NY (US)

(73) Assignee: Distech Systems Inc., Rochester, NY (US)

( * ) Notice: Subject to any disclaimer, the term of this patent is extended or adjusted under 35 U.S.C. 154(b) by 562 days.

(21) Appl. No.: 12/931,709

(22) Filed: Feb. 8, 2011

(51) Int. Cl.
   *B65B 35/30* (2006.01)

(52) U.S. Cl.
   USPC .................. 53/539; 53/153; 53/547; 53/473

(58) Field of Classification Search
   CPC ...... B65B 21/18; B65B 39/006; B65B 21/06; B65B 35/50; B65B 5/06
   USPC ........... 53/539, 540, 153, 247, 244, 251, 473, 53/443
   See application file for complete search history.

(56) References Cited

U.S. PATENT DOCUMENTS

| | | | | |
|---|---|---|---|---|
| 3,587,888 | A | * | 6/1971 | Warren .......................... 414/728 |
| 3,724,639 | A | * | 4/1973 | Hara .............................. 198/430 |
| 4,122,937 | A | * | 10/1978 | Vischer et al. ................ 198/408 |
| 4,199,049 | A | * | 4/1980 | Vamvakas ..................... 198/408 |
| 4,206,941 | A | * | 6/1980 | Wild .......................... 294/87.26 |
| 4,259,826 | A | * | 4/1981 | Campbell ....................... 53/543 |
| 4,300,330 | A | * | 11/1981 | Hartness ........................ 53/539 |
| 4,644,734 | A | * | 2/1987 | Hartness ........................ 53/500 |
| 5,060,455 | A | * | 10/1991 | Schmeisser ..................... 53/448 |
| 6,453,649 | B1 | * | 9/2002 | Kammler et al. ............... 53/473 |
| 7,551,357 | B2 | * | 6/2009 | Huang .......................... 359/619 |
| 8,534,450 | B2 | * | 9/2013 | Werner et al. ................. 198/429 |
| 2012/0031050 | A1 | * | 2/2012 | Werner et al. .................. 53/448 |

* cited by examiner

Primary Examiner — Sameh H. Tawfik
(74) Attorney, Agent, or Firm — Michael R. Philips (57) ABSTRACT

An apparatus and method is provided for loading objects having a first degree of hardness onto a tray having a different degree of hardness where sliding contact between the objects and the tray would cause damage. The tray loading is accomplished by engaging and holding objects in a carrier. The carrier carries the objects to a position over the tray and lowers the objects onto the tray surface, avoiding abrasion between the objects and the tray. The carrier includes sensors for verifying the presence of the objects.

15 Claims, 6 Drawing Sheets

1. Specify a number of vials to equal one full row
2. Specify a number of rows to fill a tray
3. Select parallel or staggered row tray packing pattern
4. Position a vial carrier adjacent to a row of vials at end of vial conveyor
5. Move alignment comb in contact with the row of vials
6. Move carrier in negative X direction to engage row of vials
7. Activate vacuum nozzles to secure vials in carrier
8. Confirm number of vials engaged in carrier
9. If number of vials is less than the specified number, stop
10. If number of vials is equal to the specified number, lift carrier in positive Z direction
11. Move carrier in negative Y direction to position opposite tray at parallel or staggered location
12. Move alignment comb away from vial conveyor
13. Open escapement to move next row of vials to end of vial conveyor
14. Move carrier in negative X direction to position vials over tray in next row location
15. Lower carrier in negative Z direction to place vials on tray surface
16. Deactivate vacuum nozzles to release vials
17. Move carrier in positive X direction out of tray
18. Test whether any vials remain in carrier
19. If any vials remain in carrier, stop
20. If no vials remain in carrier, move carrier in positive Y direction to rest adjacent to a subsequent row of vials
21. Determine if number of rows loaded on the tray equals a full tray
22. If number of rows loaded equals a full tray, replace full tray with a new tray
23. Repeat steps 5 through 22

Fig. 7

TRAY LOADER AND METHOD

FIELD OF THE INVENTION

The present invention relates to the field of packing equipment, and more particularly to equipment for placing pharmaceutical vials onto trays without sliding contact in order to avoid tray abrasion.

BACKGROUND OF THE INVENTION

For reasons of maintaining a sanitary environment for the manufacture of pharmaceutical products, processing and handling equipment have been traditionally made of stainless steel. As is well understood, stainless steel will not oxidize and may be cleaned repeatedly in an autoclave. Many pharmaceutical products, e.g. serums, vaccines, and other injectable medications are packaged in glass vials. The glass vials are typically sealed with a metal band holding an elastomeric membrane over the vial opening.

These glass vials are generally loaded onto stainless steel trays during the manufacturing process, e.g. for autoclaving, filling, or transporting. Depending on the stage of processing, the glass vials may be either empty or full when loaded onto trays. In all known tray loading machinery, the vials are pushed onto the trays causing the bottom of the vial to rub across the surface of the tray. It is well known that glass is very hard, on the order of 68-72 on the Rockwell C Hardness Scale. By comparison, stainless steel has a hardness of approximately 17 on the same scale, being much softer than glass. Therefore, rubbing glass on stainless steel will scratch the stainless steel surface and generate a fine particulate metallic dust. Federal Food And Drug Administration regulations prohibit any particulate in pharmaceutical clean environments as a potential source of contamination. With existing tray loading machinery this problem cannot be avoided and must be corrected by either periodically refinishing the tray surface or by replacing badly abraded trays. In addition to the danger of product contamination, tray remediation or replacement is expensive. In current pharmaceutical processing some equipment, e.g. handling trays, may be made of a plastic resin that can withstand the autoclaving process. Plastic resin will be readily scratched by abrasion with a glass vial being pushed over the plastic surface, in some cases producing unacceptable particulate.

An alternate type of equipment for loading parts into cartons or onto trays is known in the packaging industry. This loading equipment operates by engaging the bottle, box or other piece for packing from above, therefore exposing the top of the piece to contamination. Because of the potential for contamination, this equipment is not considered to be acceptable for use in loading pharmaceutical vials onto trays.

SUMMARY OF THE INVENTION

The present invention overcomes the problems outlined above by providing a tray loader apparatus and method that places the vials on the trays effectively without rubbing or abrasion of the contacting surfaces. The tray loader of the invention simultaneously engages a number of vials at and below the level of the vial neck with no part overriding the top of the vials. The engaging vial carrier utilizes nesting fingers for holding the vials in a linear array, grasping components for ensuring that the vials do not disengage from the carrier, and sensors to verify that the proper number of vials are engaged and are delivered to the tray. The apparatus then lifts the vials and places the vials onto the surface of a tray. The tray loader disclosed is programmable to place the vials onto the trays in either rectilinear alignment or with successive rows of vials staggered to create a nested pattern. Programming counts the total number of vials loaded to signal when the instant tray is full.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

Figure 1:
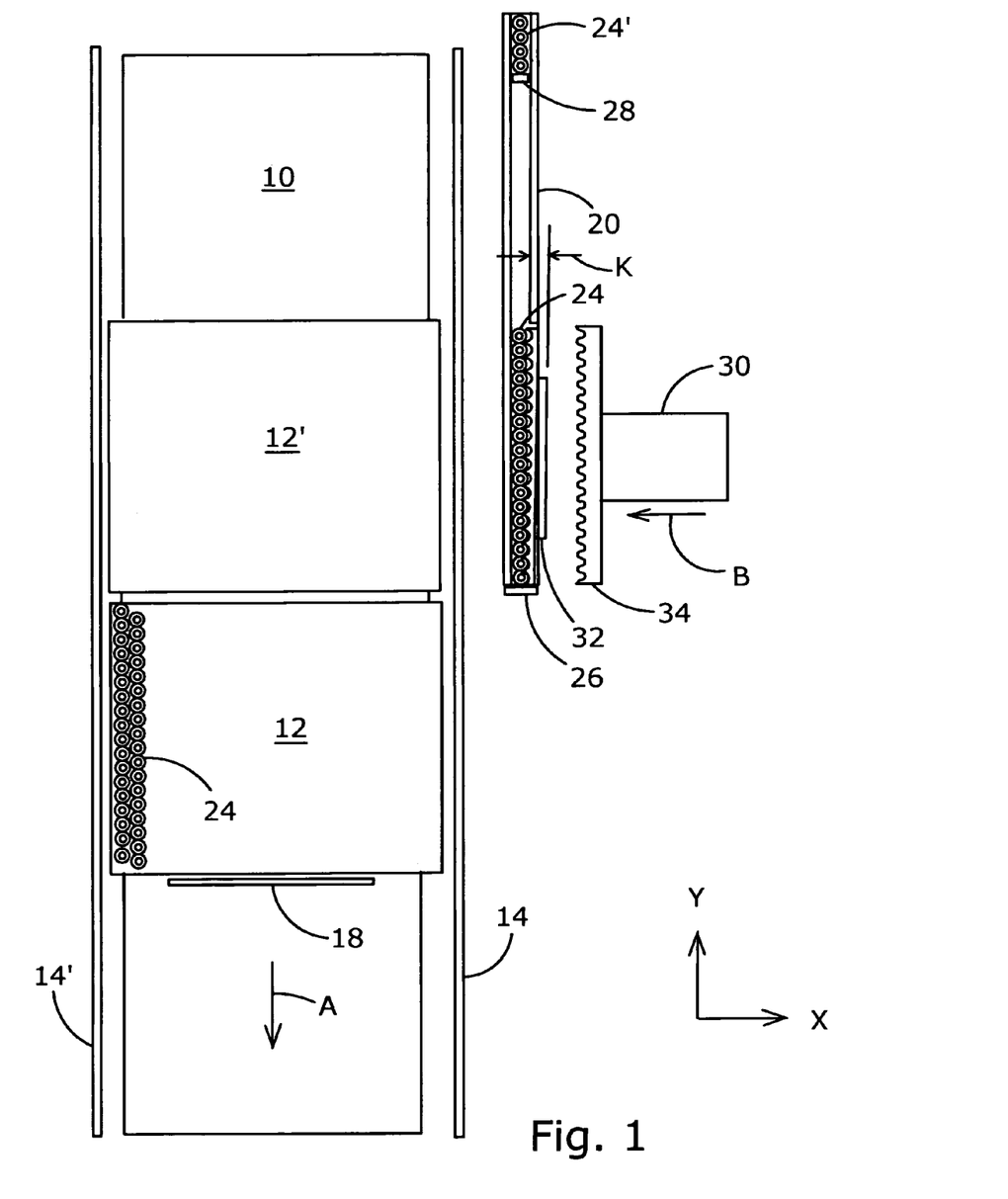
FIG. 1 is a schematic plan view of a tray conveyor and a vial conveyor with a tray loader apparatus of the invention with a vial carrier positioned for engaging a row of vials to be loaded onto a tray.

Referring to FIG. 1, a tray conveyor 10 is provided for conveying a series of trays 12, 12' in the direction indicated by arrow A. A pair of side rails 14, 14' are mounted adjacent to tray conveyor 10 to maintain trays 12, 12' in linear alignment along a defined path. A tray locator 18 is movably mounted to be positioned across tray conveyor 10 as each new tray 12, 12' is located for being loaded with vials. When first tray 12 is filled, tray locator 18 is moved out of position to allow tray 12 to move downstream and to bring second tray 12' into position for loading. Additional trays (not shown) are serially loaded onto the upstream end of tray conveyor 10 by automated or manual means. Two rows of objects, for example vials 24, are depicted as having previously been loaded onto tray 12. Whereas the invention is described generally as an apparatus and method for loading vials onto trays, it is understood that loading any object having a first degree of hardness onto a tray having a different degree of hardness would benefit from the present invention.

Referring further to FIG. 1, a vial conveyor 20 is positioned adjacent to tray conveyor 10, e.g. in parallel orientation thereto. A full row of vials 24 is positioned in vial conveyor 20 with the leading vial in contact with a fixed stop 26 to hold vials 24 in a positive location. In the illustrated embodiment of the present invention, a full row of vials 24 equals eighteen vials. Different numbers of vials per row is considered to be within the scope of the invention. A partial row of vials 24' is held upstream in vial conveyor 20 by a controllable escapement 28. The side rails of vial conveyor 20 are preferably separated by a distance sufficient to allow vials 24 to slide or be conveyed therebetween in substantially linear alignment. Vial conveyor 20 may optionally be a mechanically driven belt, a gravity fed chute, or another type conveyor for placing vials 24 in position for being engaged by vial carrier 34. Whereas the diameter of each vial 24 is e.g. nominally 0.750 inches, manufacturing tolerances allow a difference of e.g. +/−0.010 inches. It is important to maintain a desired distance from the centerline of each vial to adjacent vials to avoid misalignment. Misalignment would result in vial carrier 34 rubbing against the neck of the off-center vials, possibly resulting in scratching or damage of the vial carrier. This rubbing and possible damage would likely produce particulate contaminate and necessitate repair or replacement of vial carrier parts. To minimize this problem, an alignment comb 32 is positioned adjacent to vial conveyor 20 and is brought into contact with vials 24 first, after which vial carrier 34 is brought into contact with vials 24. Alignment comb 32 is formed as a planar member having a scalloped leading edge, each concavity of the scallop configured similar to the radius of the body portion of vial 24 and being an arc of less than 180°. Alignment comb 32 engages the exposed lower segment of vials 24 without interfering with contact between adjacent vials 24. Alignment comb 32 is oriented at a slight angle K with relation to vial conveyor 20 and carrier 34 to capture vials 24 sequentially, thus allowing a low stress repositioning of the vials to the desired spacing. In this way, alignment comb 32 holds each vial 24 with its centerline at a position one nominal diameter from the centerline of the adjacent vials 24.

Referring further to FIG. 1, a vial carrier 34 is positioned adjacent to vial conveyor 20 and juxtaposed to the full row of vials 24. Carrier 34 is mounted to the outer end of an arm 30, the inner end of arm 30 being operatively connected to a multi-axis driver mechanism, such as a multi-axis servo mechanical system (not shown). The servo system is operated by a microprocessor that is programmable through a human-machine interface as will be described below. The outer edge of carrier 34 (the left edge as illustrated) is configured as a linear array of fixed width scalloped cavities spaced a fixed distance from one another, each cavity configured for engaging the neck portion of a vial 24. It is contemplated that the present invention tray loader may be used for loading different size vials by replacing a current vial carrier with a different vial carrier adapted to conform thereto. Arm 30 now moves in the direction indicated by arrow B, i.e. in the negative X direction according to the axis reference shown at the bottom right hand section of the drawing. This movement of arm 30 brings carrier 34 into engagement with the full row of vials 24 in a manner to contact the neck of each vial 24 and have no portion of carrier 34 above the top of vials 24. When carrier 34 is in contact with vials 24, a securing mechanism holds vials 24 in carrier 34 and a sensor array acts to confirm that each of the full row of vials 24 is in position, as will be described below. Arm 30 and carrier 34 next lift vials 24 out of vial conveyor 20 and move in the negative Y direction to arrive at a position in alignment with tray 12.

Figure 2:
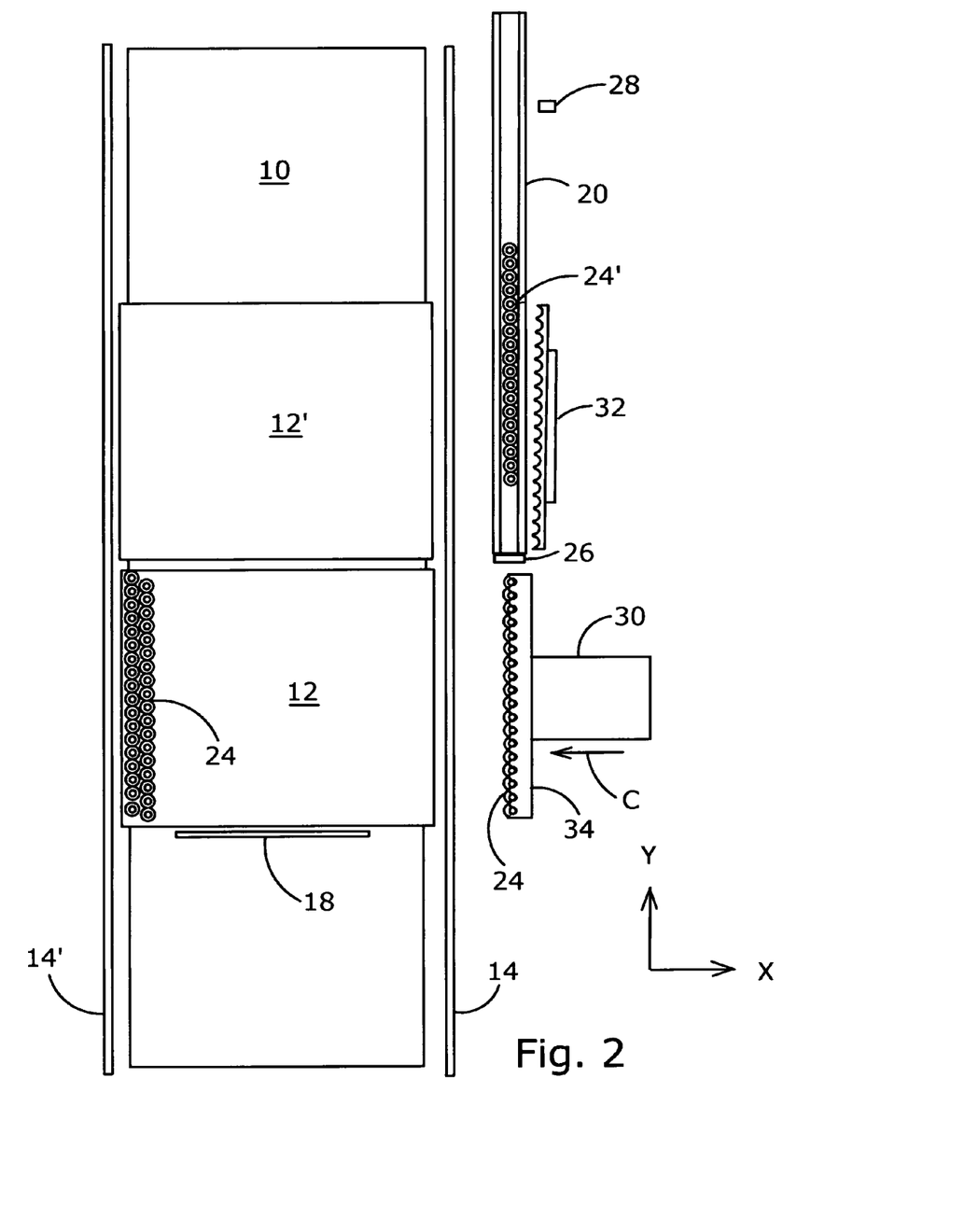
FIG. 2 is the plan view of FIG. 1 wherein the tray loader apparatus has carried the vials into alignment with a tray being loaded.

Referring now to FIG. 2, carrier 34 is holding the first row of vials 24 in alignment with tray 12 at a height above vial conveyor 20 and also above tray 12. Arm 30 and carrier 34 next move in the direction indicated by arrow C, i.e. in the negative X direction, to bring vials 24 into tray 12 at a height above tray 12 in order to avoid contacting the surface thereof. Pursuant to vials 24 being lifted out of vial conveyor 20, escapement 28 opens to allow a second full row of vials 24' to move along vial conveyor 20. Alignment comb 32 is now in the retracted position where it remains until the start of the next process cycle.

Figure 3:
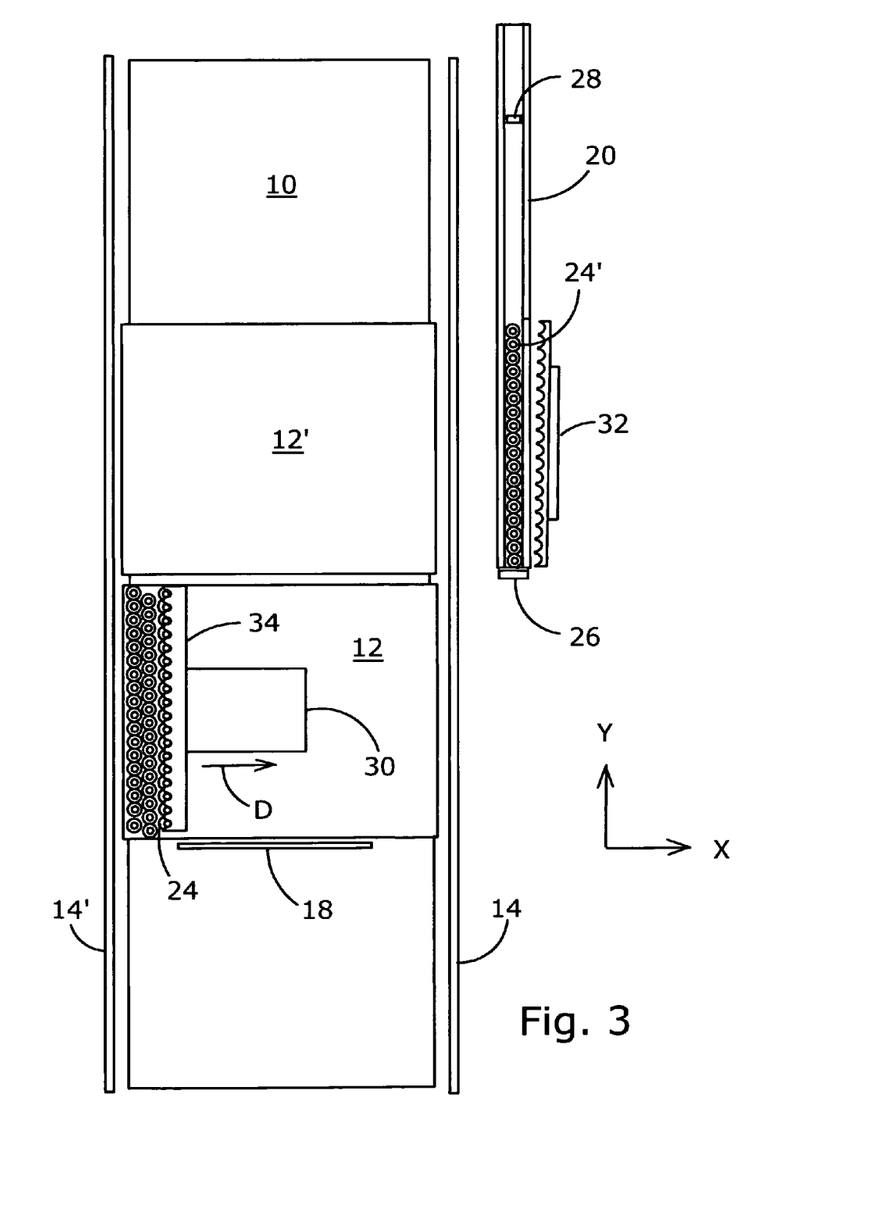
FIG. 3 is the plan view of FIG. 2 wherein the tray loader apparatus is holding the row of vials over the tray in position for placement.

Referring now to FIG. 3, arm 30 and vial carrier 34 have moved horizontally over tray 12 to the desired position for placing the carried row of vials 24 adjacent to the two previously placed rows of vials. In this position, arm 30 lowers carrier 34 vertically to place the new row of vials 24 on the surface of tray 12 without horizontal movement and without abrasion between vials 24 and tray 12. At the same time, a further row of vials 24' has moved along vial conveyor 20 to be in contact with stop 26 for being accessible for subsequent pickup by carrier 34. Escapement 28 has returned to the blocking position for receiving and holding another row of vials. Arm 30 and carrier 34 will now move in the direction indicated by arrow D, i.e. in the positive X direction. After releasing vials 24 and moving in the positive X direction, sensors in carrier 34 confirm that no vial remains held in contact with carrier 34.

Figure 4:
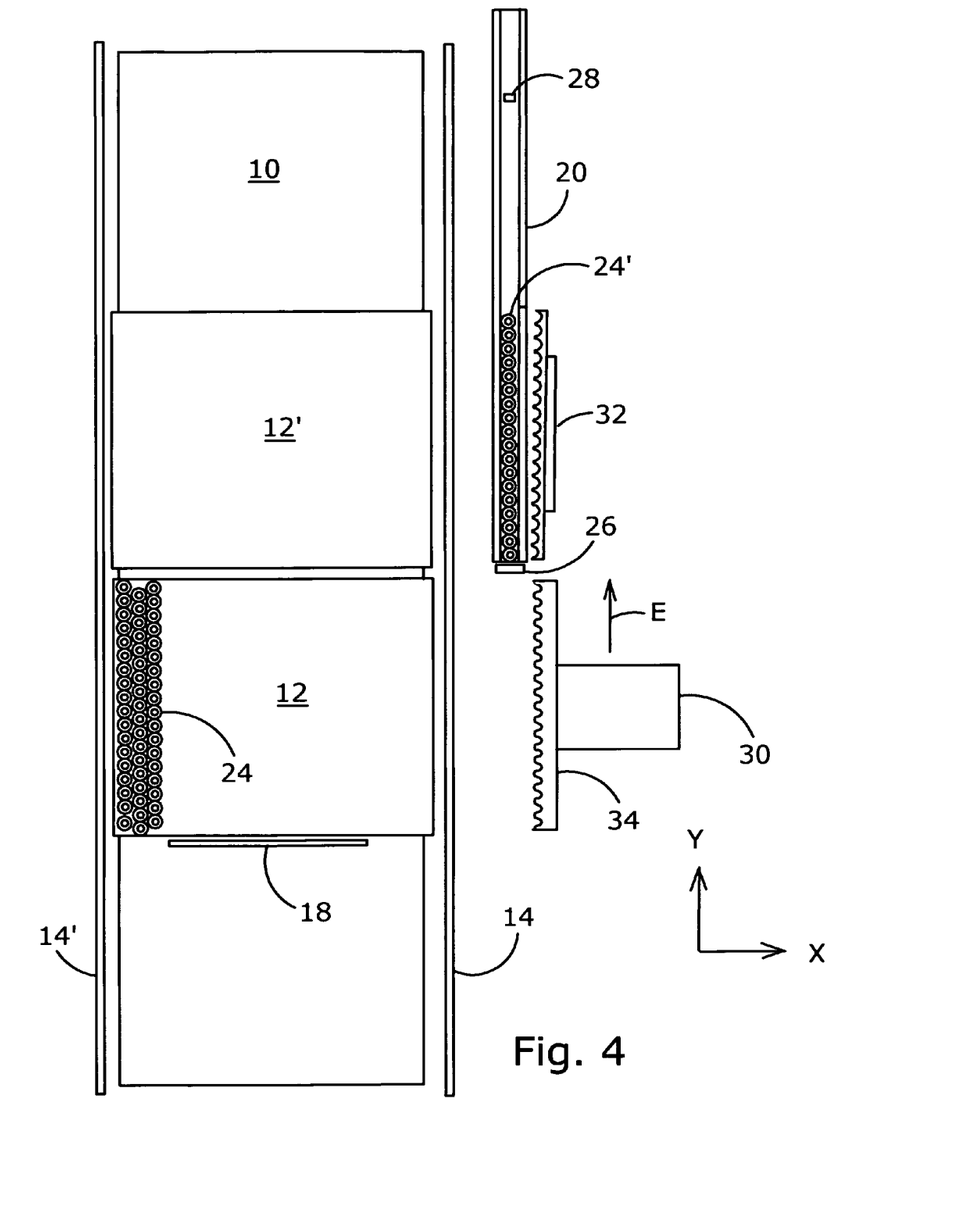
FIG. 4 is the plan view of FIG. 3 wherein the tray loader apparatus has placed the row of vials onto the tray and retreated to a position for moving laterally and engaging another row of vials.

Referring now to FIG. 4, three rows of vials 24 are situated in a nested staggered row array in tray 12 with arm 30 and carrier 34 positioned out of tray 12 slightly beyond the distal edge of vial conveyor 20. As noted above, alternate vial array geometric arrangements are possible, e.g. straight line rows, as may be programmed by the user of the disclosed tray loader apparatus. Arm 30 and carrier 34 next move in the direction indicated by arrow E, i.e. the positive Y direction. After this positive Y movement, carrier 34 is disposed as shown in FIG. 1 to repeat the cycle. It is noted that carrier 34 remains at the height at which the last row of vials 24 were placed onto the surface of tray 12 to engage a next row of vials 24' residing in vial conveyor 20.

Figure 5:
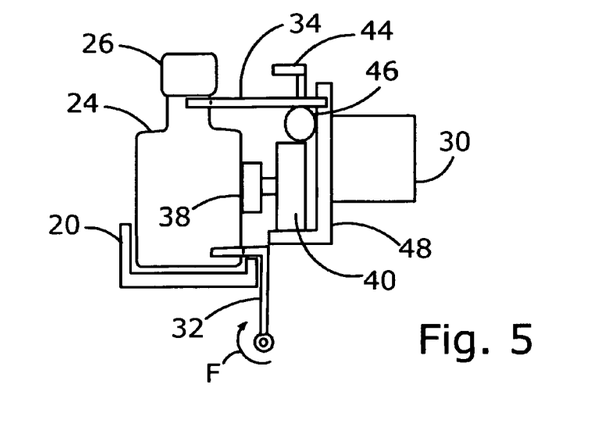
FIG. 5 is an enlarged side elevation view of the carrier assembly for engaging and carrying vials.

Referring now to FIG. 5, a view of carrier 34 and related apparatus is illustrated in enlarged side elevation view as vials 24 are supported on vial conveyor 20 and engaged by alignment comb 32 and by carrier 34. A similar apparatus is provided at each position of vials 24 along vial conveyor 20. Alignment comb 32 is configured with each scalloped shape (see FIG. 1) slightly larger in radius than vial 24 for holding vial 24 with no pressure to enable vial carrier 34 to lift vial 24 without rubbing. Alignment comb 32 is seen as being engaged to hold vial 24 at a nominal center distance from vials 24 adjacent thereto. In the next process step, after vial carrier 34 lifts vials 24 out of vial conveyor 20, alignment comb 32 pivots in the direction indicated by arrow F to a retracted position awaiting a further row of vials 24 to arrive in position for being engaged. Alternate movement modes for advancing and retracting alignment comb 32, e.g. linear motion, are similarly effective. A frame 48 is provided to mount the various components to arm 30. Carrier 34 is configured to slidingly engage the neck portion of vial 24 slightly below cap 26. It is noted that no portion of carrier 34 or related apparatus overrides, i.e. is not positioned directly above, the top of vial 24, therefore minimizing the possibility of contamination. A vacuum nozzle 38 contacts the body portion at approximately the same time as carrier 34 contacts the neck portion of vial 24 and applies a vacuum to hold vial 24. Each vacuum nozzle 38 is connected to a vacuum source (not shown) through a vacuum manifold 40. A sensor 44, for example a photoelectric cell, is provided at a position to detect the presence of vial 24, with power and signal wires being bundled in a chase 46. Alternate types of sensors are considered to be adaptable to the present invention. Vacuum manifold 40 and wires from sensors 44 are connected to a microprocessor to be described below. Whereas sensors 44 are capable of detecting the presence of a vial 24, programming in the microprocessor can be employed to detect if a vial 24 is missing.

Figure 6:
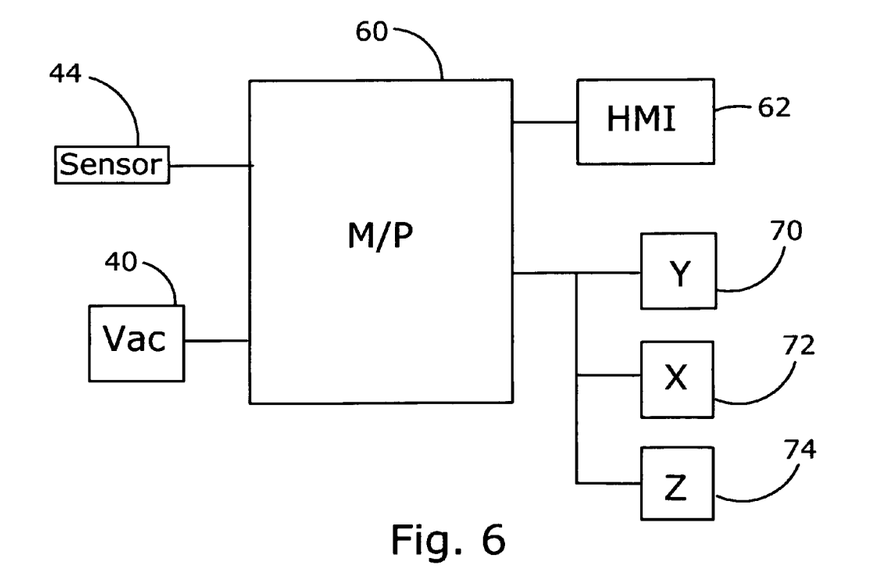
FIG. 6 is a block diagram of the tray loader system of the invention.

Referring now to FIG. 6, a block diagram is shown to portray the primary functional components of the present invention in operational connected relationship. Function control of the tray loader apparatus resides in a microprocessor 60. A human-machine interface (HMI) 62 is provided for establishing operating parameters of a production batch and for displaying output information. HMI 62 is, according to the preferred embodiment, a screen capable of displaying an image and of receiving instructions by touch, i.e. a "touch screen." Among optional parameters available are the number of vials per row, the number of rows per tray, and whether the rows are to be packed in straight lines or in a staggered relationship.

Referring further to FIG. 6, each sensor 44 is connected to microprocessor 60. Microprocessor 60 initiates a detection command to sensors 44 and microprocessor 60 reacts according to the signal received to either continue or stop operations. Vacuum manifold 40 is also connected to microprocessor 60 in which a control switch activates and deactivates the vacuum at appropriate times during the operating cycle to hold or release vials.

Referring again to FIG. 6, microprocessor 60 is operatively connected to a multi-axis servo mechanical system to control the motions described above. The multi-axis servo mechanical system is characterized as Y axis servo operator 70, X axis servo operator 72 and Z axis servo operator 74. According to conventional design, Y axis is for horizontally forward and backward movement, X axis is for horizontally left and right movement, and Z axis is for up and down movement.

Figure 7:
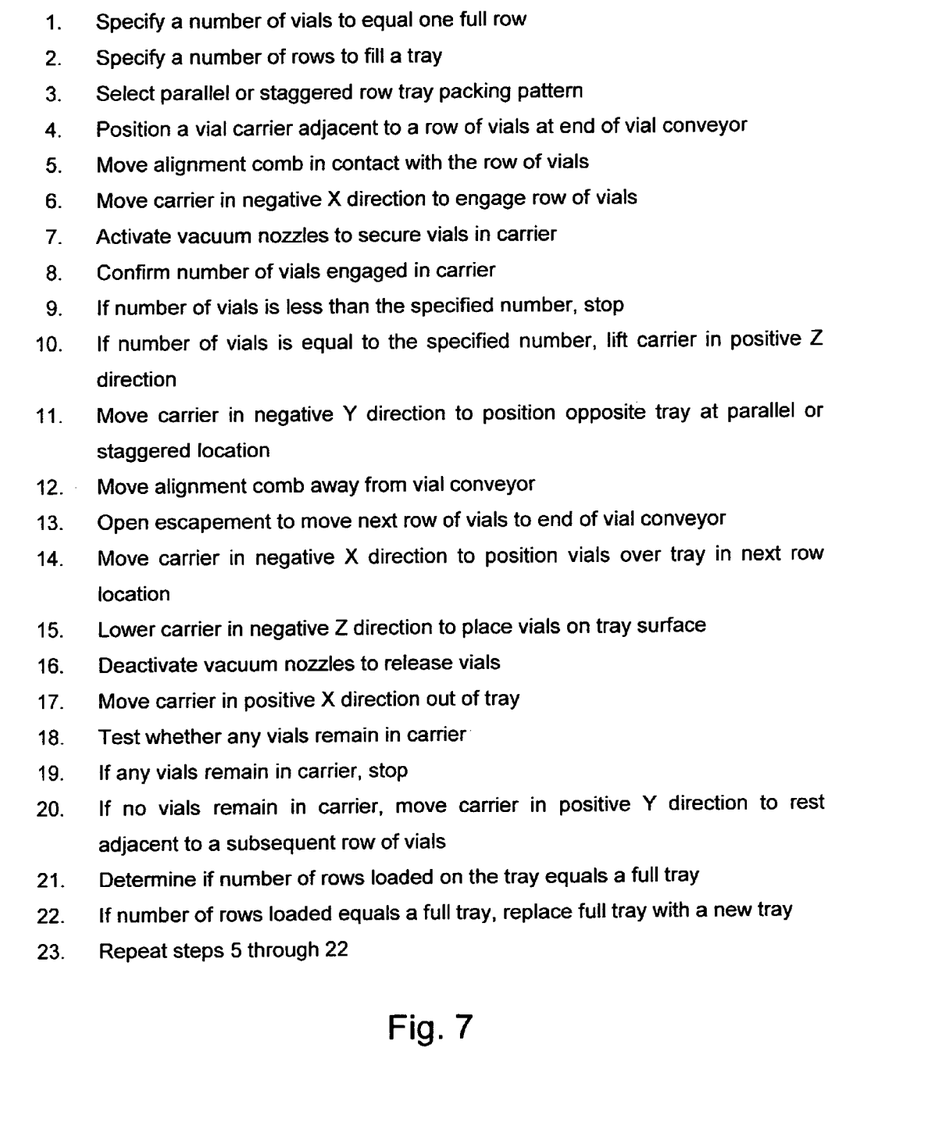
FIG. 7 is a process listing of the method steps of the invention.

Referring now to FIG. 7, a listing of the operational steps of the invention method is provided. In steps 1, 2 and 3, an operator of the invention apparatus selects a number of vials for each row, a number of rows for a full tray, whether the rows are to be placed in the tray in a straight line packing array or staggered, and any other variables set in the program. The various parameters may alternately be incorporated in a recorded program that is called up and activated for subsequent process batches. In step 4, a vial carrier is positioned adjacent to a row of vials held in a vial conveyor. In step 5, an alignment comb is brought into contact with the vials to set vial spacing. In step 6, the carrier is moved left (negative X) to engage the vials, and a vacuum is actuated to hold the vials in position in step 7. In step 8, sensors confirm the presence of all vials, the operation being stopped in step 9 if a vial is missing. If no vial is missing, the carrier is lifted (positive Z) in step 10, and the carrier is moved back (negative Y) in step 11. The alignment comb is moved away from the vial conveyor in step 12. An escapement is opened in step 13 to pass additional vials to the position for being engaged by the carrier. The carrier is moved left (negative X) in step 14 to the position for placing the row of vials held in the carrier onto the tray. The carrier is moved down (negative Z) in step 15 to place the vials on the tray without abrasion. The vacuum is deactivated in step 16, and the carrier is moved right (positive X) in step 17. Sensors are activated in step 18 to confirm that no vials remain in the carrier, and the operation is stopped in step 19 if any vial remains. If no vial remains, the carrier moves forward (positive Y) in step 20. In step 21, the microprocessor determines whether the tray is filled by comparing the number of vials loaded with the full tray quantity established. If the tray is filled, step 22 instructs the tray conveyor to move a new tray into position for loading. In step 23, if the tray is not filled, the apparatus will repeat steps 5 through 22.

Whereas the description of the invention above relates to an embodiment designed for loading pharmaceutical vials onto trays, the principals disclosed herein pertain to different items sensitive to abrasion between the item being loaded and the receiving container.

While the description above discloses preferred embodiments of the present invention, it is contemplated that numerous variations of the invention are possible and are considered to be within the scope of the claims that follow.

What is claimed is:

1. A tray loader, comprising:
    a. a carrier formed with a linear array of cavities for engaging and carrying a linear row of objects, each object having a top and a neck and each cavity having a fixed width, the cavities spaced a fixed distance from one another;
    b. means for holding the objects in contact with the carrier, the means assembled to the carrier; and
    c. means for sensing the presence of objects in contact with the carrier, the means assembled to the carrier;
    d. wherein the carrier engages the neck of each object and wherein no portion of the tray loader overrides the tops of the objects.

2. The tray loader described in claim 1, wherein the means for holding the objects in contact with the carrier comprises vacuum means.

3. The tray loader described in claim 2, wherein the vacuum means comprises a vacuum nozzle positioned for contacting each object received in the carrier and wherein each nozzle is connected to a common vacuum manifold.

4. The tray loader described in claim 1, wherein the means for sensing comprises a plurality of photoelectric cells.

5. The tray loader described in claim 1, wherein the carrier comprises a planar member and the linear array of cavities comprises a scalloped elongate edge.

6. The tray loader described in claim 1, wherein the carrier is connected to and moved by a multi-axis driver mechanism capable of placing the objects down onto the tray without abrasion therebetween.

7. The tray loader described in claim 1, further comprising an alignment comb mounted adjacent to the carrier and having a plurality of concavities for positioning the objects for being engaged by the carrier.

8. The tray loader described in claim 7, wherein the alignment comb is oriented at an angle to the carrier.

9. A tray loader, comprising:
    a. a carrier formed with a linear array of cavities for engaging and carrying a linear row of objects, each object having a top and a neck positioned below the top, and each cavity having a fixed width, the cavities spaced a fixed distance from one another;
    b. means for holding the objects in contact with the carrier, the means for holding assembled to the carrier;
    c. means for sensing the presence of objects in contact with the carrier, the means or sensing assembled to the carrier;
    d. wherein the carrier is sized and positioned for engaging the necks of the objects without overriding the tops of the objects; and
    e. wherein the carrier is connected to and moved by a multi-axis driver mechanism.

10. The tray loader described in claim 9, wherein the means for holding the objects in contact with the carrier comprises vacuum means.

11. The tray loader described in claim 10, wherein the vacuum means comprises a vacuum nozzle positioned for contacting each object when the objects are received in the carrier and wherein each vacuum nozzle is connected to a common vacuum manifold.

12. The tray loader described in claim 9, wherein the means for sensing comprises a plurality of photoelectric cells.

13. The tray loader described in claim 9, wherein the carrier comprises a planar member with one scalloped elongate edge.

14. The tray loader described in claim 9, further comprising an alignment comb mounted adjacent to the carrier and having a plurality of concavities for positioning the objects for being engaged by the carrier.

15. The tray loader described in claim 14, wherein the alignment comb is oriented at an angle to the carrier.

* * * * *